United States Patent
Yamamotoya et al.

(10) Patent No.: US 10,358,008 B2
(45) Date of Patent: Jul. 23, 2019

(54) SUSPENSION COIL SPRING

(71) Applicant: NHK SPRING CO., LTD., Yokohama-shi, Kanagawa (JP)

(72) Inventors: Kenji Yamamotoya, Manesar (IN); Hideto Enomoto, Yokohama (JP); Ken Takahashi, Yokohama (JP); Toshiaki Sato, Yokohama (JP); Mitsuhiro Sugiyama, Yokohama (JP); Yoshio Kobayashi, Yokohama (JP); Taichi Inage, Yokohama (JP); Tomotake Kato, Yokohama (JP); Akihiko Nishikawa, Wolfsburg (DE); Masahiro Umezawa, Yokohama (JP); Michihiko Ayada, Yokohama (JP); Suguru Kajigaya, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 108 days.

(21) Appl. No.: 14/924,319

(22) Filed: Oct. 27, 2015

(65) Prior Publication Data

US 2016/0046164 A1 Feb. 18, 2016

Related U.S. Application Data

(63) Continuation of application No. PCT/JP2014/067554, filed on Jul. 1, 2014.

(30) Foreign Application Priority Data

Aug. 12, 2013 (JP) .................................. 2013-167654

(51) Int. Cl.
*B60G 11/14* (2006.01)
*F16F 1/06* (2006.01)
(Continued)

(52) U.S. Cl.
CPC ............ *B60G 11/14* (2013.01); *B60G 15/062* (2013.01); *F16F 1/043* (2013.01); *F16F 1/06* (2013.01);
(Continued)

(58) Field of Classification Search
CPC ................ B60G 11/14; B60G 2202/12; B60G 2202/312; B60G 2206/42; B60G 2206/724; B60G 2206/426; F16F 1/043
See application file for complete search history.

(56) References Cited

U.S. PATENT DOCUMENTS

| 4,077,619 A | 3/1978 | Borlinghaus |
| 4,377,280 A | 3/1983 | Wienand et al. |

(Continued)

FOREIGN PATENT DOCUMENTS

| CN | 1654844 A | 8/2005 |
| DE | 3743451 A1 | 6/1989 |

(Continued)

OTHER PUBLICATIONS

Chinese Office Action (and English translation thereof) dated Aug. 26, 2016, issued in counterpart Chinese Application No. 201480030624.6.

(Continued)

*Primary Examiner* — Xuan Lan Nguyen
(74) *Attorney, Agent, or Firm* — Holtz, Holtz & Volek PC

(57) ABSTRACT

A suspension coil spring includes a lower end turn portion, an upper end turn portion, and a helical effective portion formed between the end turn portions. The lower end turn portion includes a first portion which contacts a lower spring seat irrespective of a load, and a second portion which contacts the lower spring seat or is separated from the same according to the load. The wire diameter of the second portion is greater than that of the first portion and an average (Continued)

wire diameter of the effective portion. The upper end turn portion includes a third portion which contacts an upper spring seat, and a fourth portion. The wire diameter of the fourth portion is greater that of the third portion and the average wire diameter of the effective portion.

7 Claims, 7 Drawing Sheets

(51) Int. Cl.
    *F16F 9/32*     (2006.01)
    *F16F 1/04*     (2006.01)
    *B60G 15/06*     (2006.01)

(52) U.S. Cl.
    CPC .......... *F16F 9/32* (2013.01); *B60G 2200/142* (2013.01); *B60G 2200/22* (2013.01); *B60G 2202/12* (2013.01); *B60G 2202/312* (2013.01); *B60G 2204/1242* (2013.01); *B60G 2204/1246* (2013.01); *B60G 2206/42* (2013.01); *B60G 2206/426* (2013.01); *B60G 2206/724* (2013.01)

(56) References Cited

U.S. PATENT DOCUMENTS

| | | |
|---|---|---|
| 6,199,882 B1 | 3/2001 | Imaizumi et al. |
| 2007/0116963 A1 | 5/2007 | Sakakibara |
| 2009/0106006 A1 | 4/2009 | Nishizawa et al. |

FOREIGN PATENT DOCUMENTS

| | | | | |
|---|---|---|---|---|
| JP | 58149432 A | * | 9/1983 | ................ F16F 1/08 |
| JP | 59219534 A | | 12/1984 | |
| JP | 09014316 A | | 1/1997 | |
| JP | 2000103216 A | | 4/2000 | |
| JP | 2002067647 A | | 3/2002 | |
| JP | 2005171297 A | | 6/2005 | |
| JP | 2011000663 A | | 1/2011 | |
| JP | 2012057777 A | | 3/2012 | |

OTHER PUBLICATIONS

Canadian Office Action dated Oct. 27, 2016 issued in counterpart Canadian application No. 2,913,868.

Extended European Search Report (EESR) dated Mar. 17, 2017 issued in counterpart European Application No. 14836649.5.

International Search Report (ISR) and Written Opinion (WO) dated Aug. 26, 2014 issued in International Application No. PCT/JP2014/067554.

International Preliminary Report on Patentability (IPRP) including Written Opinion (in English) dated Feb. 25, 2016, issued in parent International Application No. PCT/JP2014/067554.

* cited by examiner

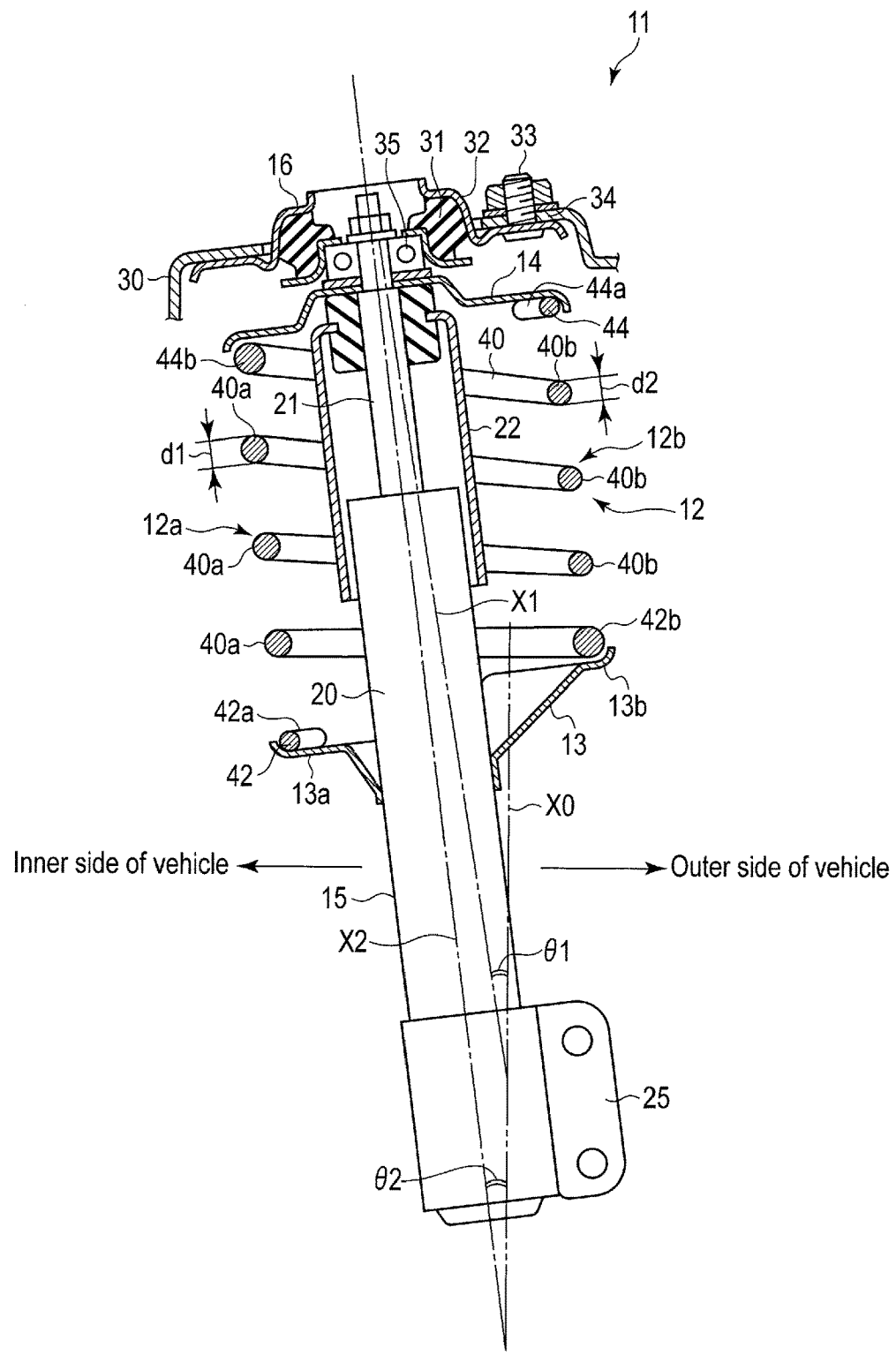
F I G. 2

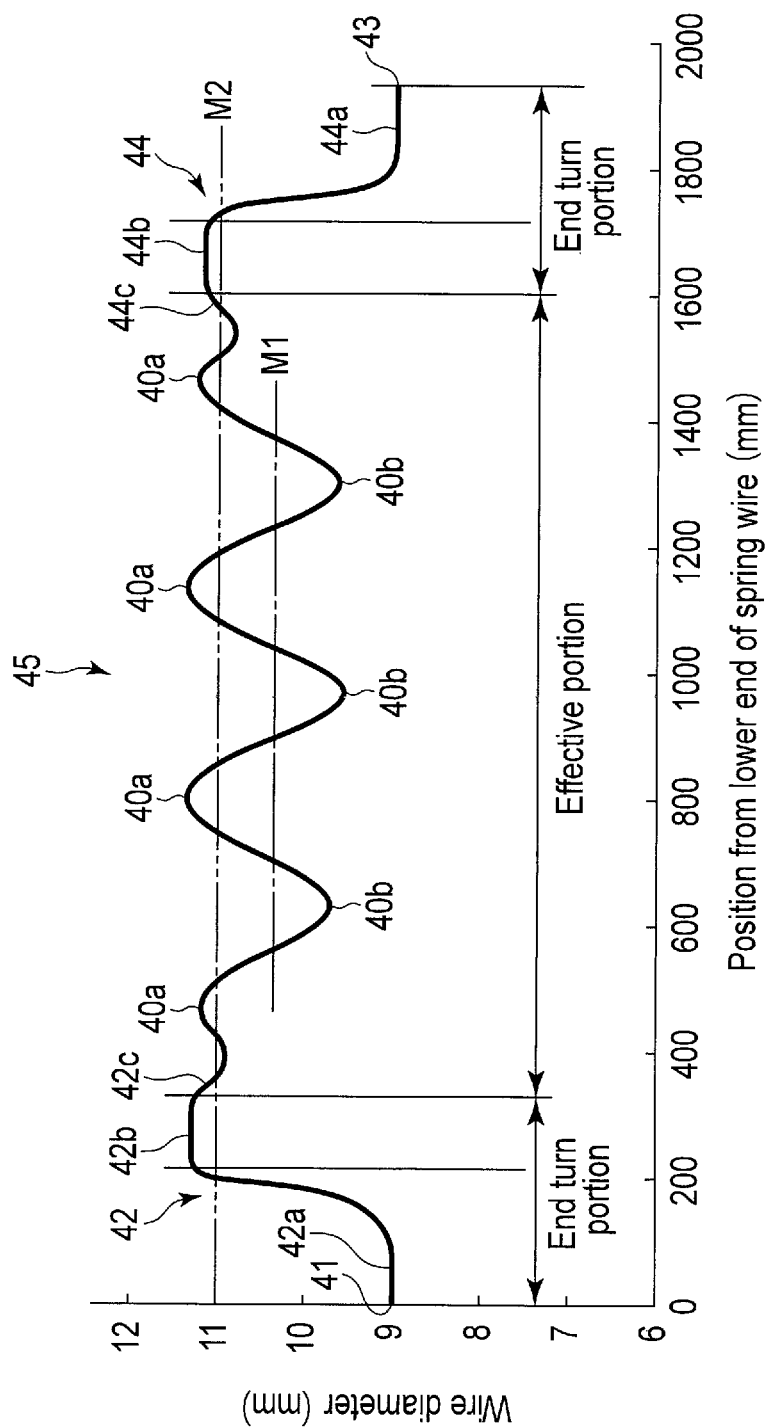
F I G. 4

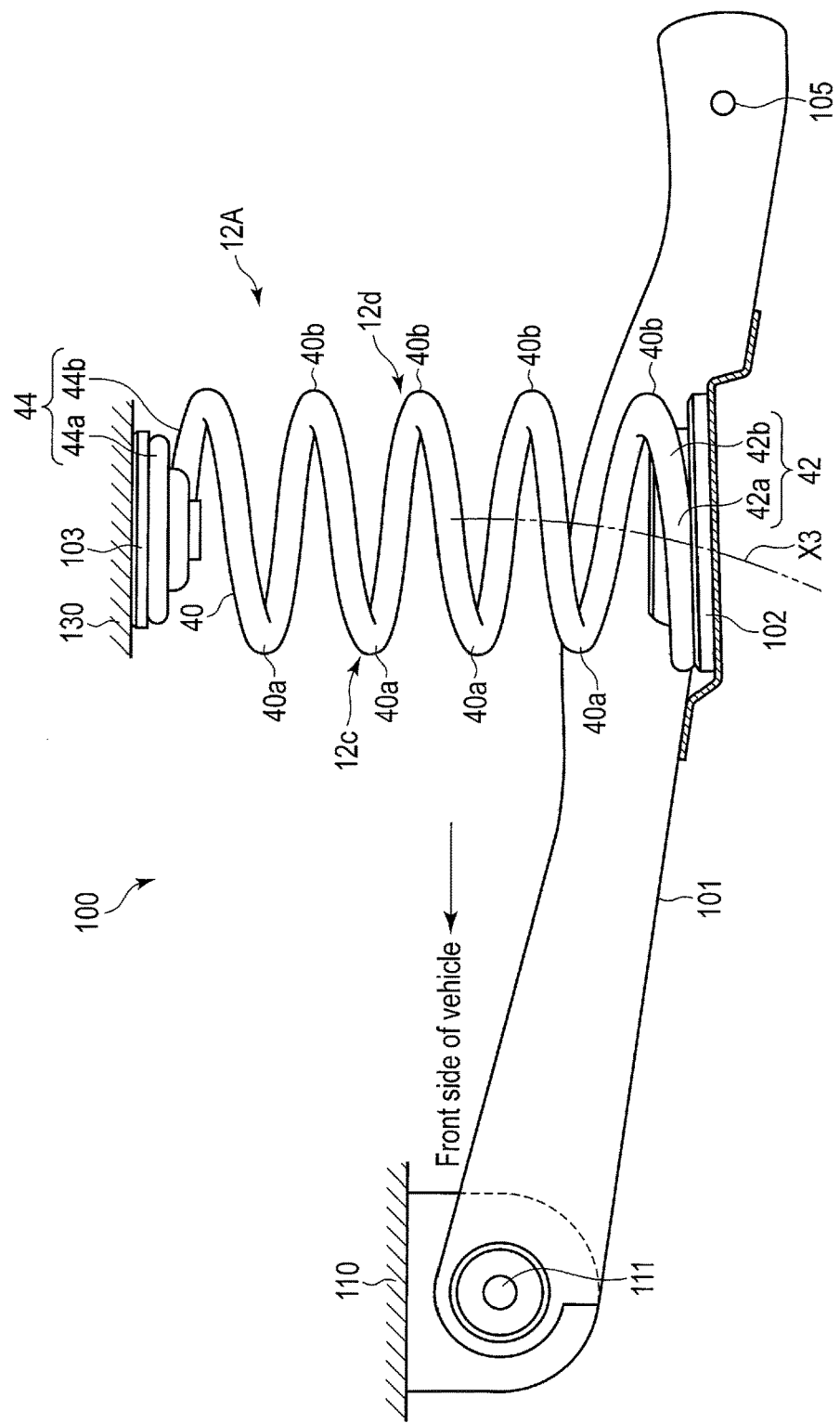
F I G. 6

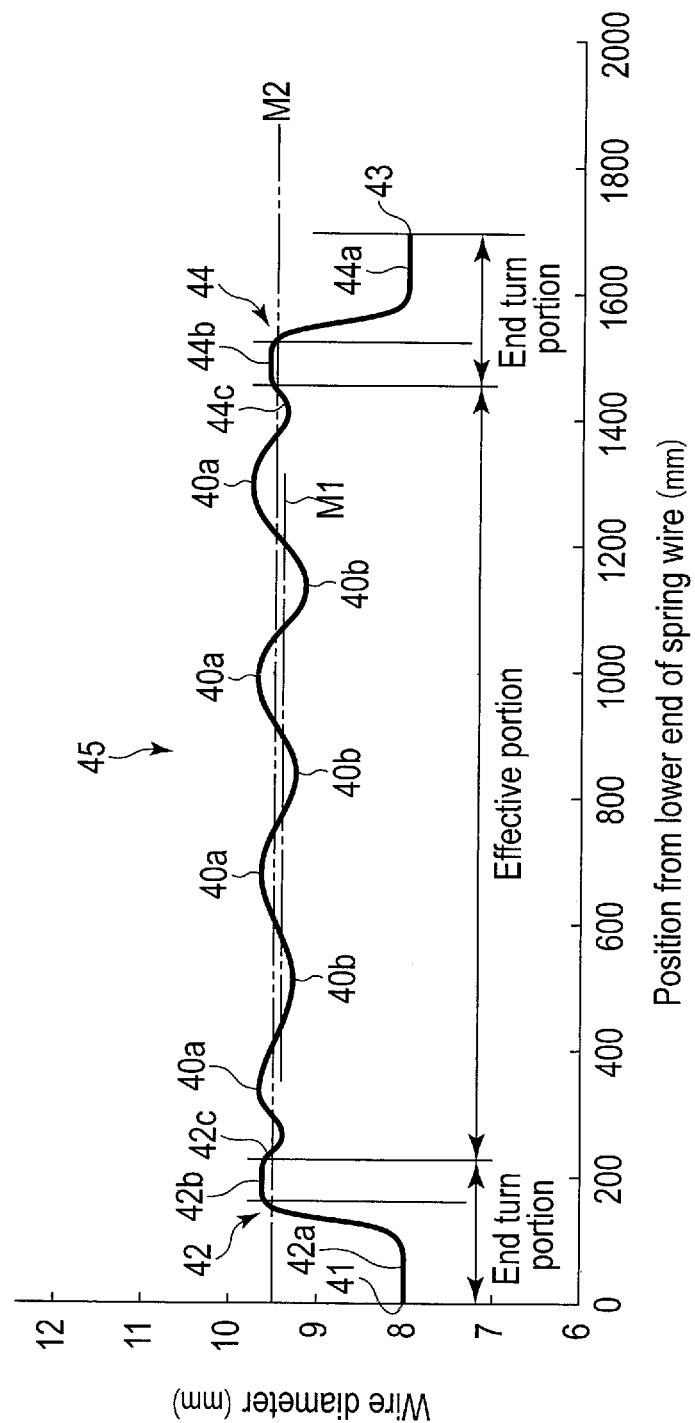
F I G. 7

SUSPENSION COIL SPRING

CROSS REFERENCE TO RELATED APPLICATIONS

This application is a Continuation Application of PCT Application No. PCT/JP2014/067554, filed Jul. 1, 2014 and based upon and claiming the benefit of priority from prior Japanese Patent Application No. 2013-167654, filed Aug. 12, 2013, the entire contents of all of which are incorporated herein by reference.

BACKGROUND OF THE INVENTION

1. Field of the Invention

The present invention relates to a coil spring for a suspension (a suspension coil spring) which is used in a suspension of a vehicle such as a car.

2. Description of the Related Art

Patent Literature 1 (JP 2000-103216 A) discloses an example of a coil spring used in a suspension of a vehicle such as a car. The suspension includes a coil spring (a compression coil spring), a lower spring seat disposed on the lower side of the coil spring, and an upper spring seat disposed on the upper side of the coil spring. The coil spring extends and retracts in accordance with the magnitude of the load. That is, the suspension coil spring is deformed between a full-rebound position at which the coil spring is at maximum extension and a full-bump position at which the coil spring is at maximum compression.

The suspension coil spring includes end turn portions which are formed at a lower end and an upper end, respectively, and an effective portion formed between the end turn portions. The end turn portion intended in this specification refers to a portion which has the possibility of contacting the spring seat in a state in which the maximum load expected is applied. That is, the end turn portion includes a portion which is always in contact with the spring seat irrespective of the magnitude of the load, and a portion which is in contact with the spring seat or separated from the same according to the load. Accordingly, when a load applied to the coil spring is small, as a part of the end turn portion is separated from the spring seat, foreign matter such as sand may be trapped between the end turn portion and the spring seat. While rust-inhibiting coating is applied to the surface of the coil spring, when the coil spring extends and retracts in a state where hard foreign matter such as sand is trapped between the end turn portion and the spring seat, the coating film may detach, leading to the formation of rust, or the surface of the coil spring may be damaged by the interposed foreign matter. Rust forms in the damaged part, and when the rust grows, it leads to the coil spring to break.

In order to prevent the surface of the coil spring from being damaged by pebbles and the like thrown up by the tire when the vehicle is traveling, as disclosed in Patent Literature 2 (JP 2005-171297 A), forming a multi-layered coating film on the surface of the coil spring has been proposed. Also, as described in Patent Literature 3 (JP 2011-000663 A), in a manufacturing process of a coil spring, combining first surface treatment by first shot peening using large projection energy, and second surface treatment by second shot peening using less projection energy has been proposed.

In a suspension coil spring, since a part of the end turn portion is in contact with the spring seat or separated from the same according to the applied load, foreign matter such as sand easily enters the space particularly between the lower end turn portion and the spring seat. A coil spring having a multi-layered coating film as in Patent Literature 2 is effective against spattered pebbles. However, the effect may not be significant for corrosion or a flaw which is caused by sand, etc., which has entered between the end turn portion and the spring seat. In Patent Literature 3, large projection energy is required for the first surface treatment by the first shot peening. Moreover, since the projection energy is different in the first shot peening and the second shot peening, two types of shot peening apparatuses are required.

BRIEF SUMMARY OF THE INVENTION

Accordingly, the object of the present invention is to provide a suspension coil spring capable of making the end turn portion hard to break regardless of whether a special coating film or surface treatment is applied.

One embodiment of the present invention relates to a compression coil spring formed of a wire made of spring steel, which is shaped helically, in which the compression coil spring is arranged in a state that it is compressed between a lower spring seat and an upper spring seat of a suspension, and extends and retracts within a predetermined range of deformation (between a full-rebound state and a full-bump state) according to a load. The compression coil spring includes a lower end turn portion which is supported by the lower spring seat, an upper end turn portion which is supported by the upper spring seat, and an effective portion formed between these end turn portions. Further, the lower end turn portion includes a first portion which is always in contact with the lower spring seat irrespective of the magnitude of the load, and a second portion which is in contact with the lower spring seat or separated from the same according to the load, and having a wire diameter greater than the wire diameter of the first portion and the average wire diameter of the effective portion.

According to the present invention, it is possible to prevent corrosion caused by hard foreign matter such as sand which may be trapped between the end turn portion and the spring seat of a suspension coil spring, and breaking of the coil spring by the end turn portion becoming worn, thereby enabling the durability of the suspension coil spring to be improved regardless of whether a special coating film or surface treatment is applied.

In one embodiment, the upper end turn portion includes a third portion which is always in contact with the upper spring seat irrespective of the magnitude of the load, and a fourth portion which is in contact with the upper spring seat or separated from the same according to the load, and having a wire diameter greater than the wire diameter of the third portion and the average wire diameter of the effective portion. Further, the wire diameter of the second portion is greater than the wire diameter of the fourth portion. A first wire diameter varying portion whose wire diameter is continuously varied may be provided between the second portion and the effective portion, and a second wire diameter varying portion whose wire diameter is continuously varied may be provided between the fourth portion and the effective portion. The effective portion may include a large-diameter wire portion and a small-diameter wire portion between which a wire diameter of the wire is varied in a length direction of the wire.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a longitudinal sectional view of the suspension shown in FIG. 1;

FIG. 4 is a graph showing the relationship between a position from a lower end of a wire of the coil spring shown in FIG. 3 and a wire diameter;

FIG. 6 is a side view of the suspension shown in FIG. 5; and

FIG. 7 is graph showing the relationship between a position from a lower end of a wire of a coil spring shown in FIG. 6 and a wire diameter.

DETAILED DESCRIPTION OF THE INVENTION

A suspension comprising a suspension coil spring according to a first embodiment will now be described with reference to FIGS. 1 to 4.

Figure 1:
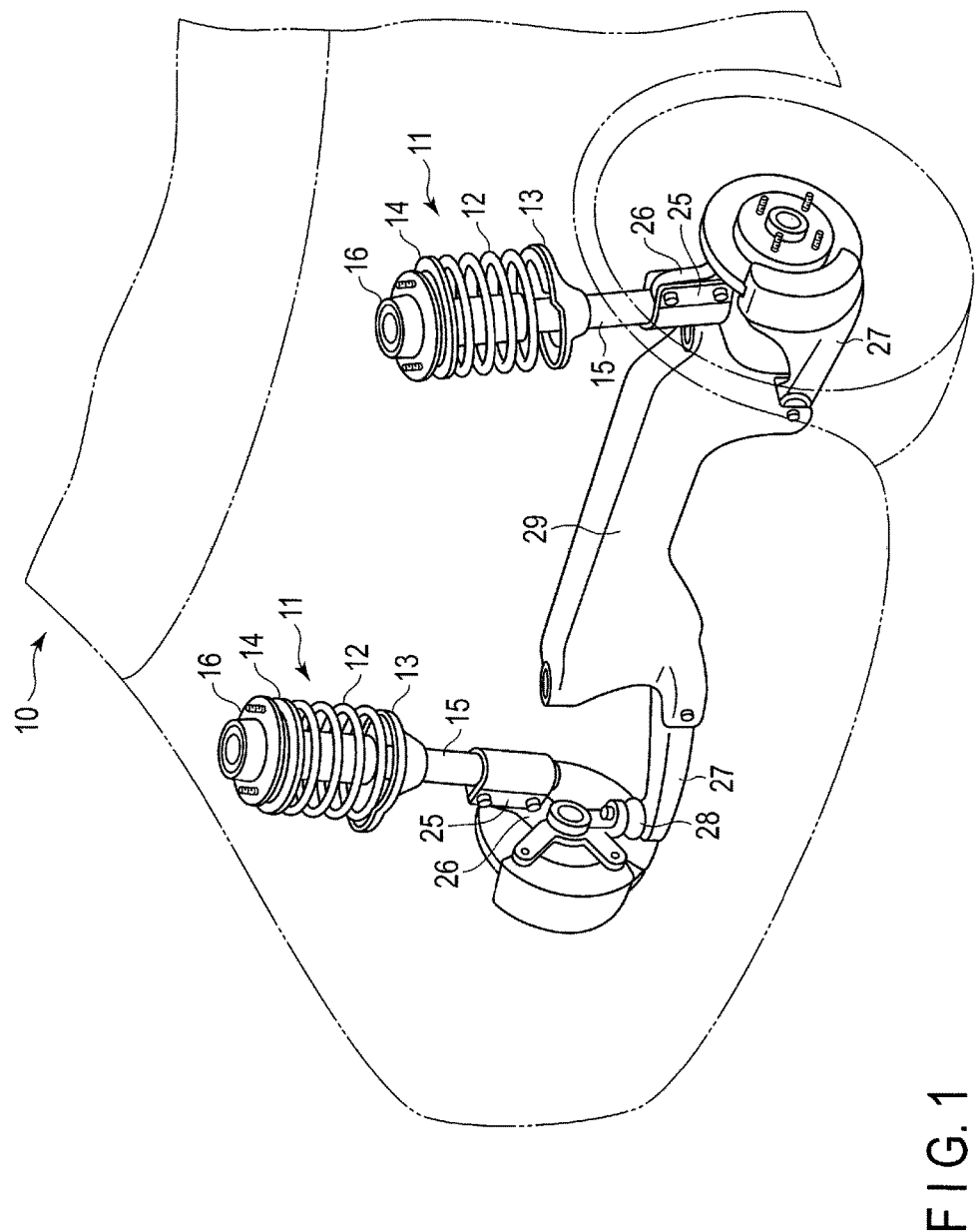
FIG. 1 is a perspective view which schematically shows a part of a vehicle provided with a suspension according to a first embodiment.

FIG. 1 shows a strut-type suspension 11 disposed on the front side of a vehicle 10. FIG. 2 is a cross-sectional view of the suspension 11. The suspension 11 comprises a suspension coil spring (hereinafter referred to as a coil spring) 12, a lower spring seat 13, an upper spring seat 14, a shock absorber 15, and a mount insulator 16. The lower spring seat 13 is disposed on the lower side of the coil spring 12. The upper spring seat 14 is disposed on the upper side of the coil spring 12. Central axis X1 (FIG. 2) of the coil spring 12 extends longitudinally in the upward and downward directions at an angle of θ1 with respect to vertical line X0.

The lower spring seat 13 comprises an inner-side spring receiving portion 13a and an outer-side spring receiving portion 13b. The inner-side spring receiving portion 13a is positioned on the inner side of the vehicle with respect to the width direction of the vehicle 10. The outer-side spring receiving portion 13b is positioned on the outer side of the vehicle with respect to the width direction of the vehicle 10. The shock absorber 15 comprises a cylinder 20, a rod 21, a damping force generation mechanism provided inside the cylinder 20, and a cover member 22. Fluid such as oil is contained in the cylinder 20. The rod 21 is inserted into the cylinder 20. The cover member 22 covers a sliding portion of the rod 21. The rod 21 can extend and retract in the direction of axis X2 of the shock absorber 15 relative to the cylinder 20. The damping force generation mechanism applies resistance to the movement of the rod 21. The shock absorber 15 is mounted on a vehicle body 30 at an angle of θ2 (FIG. 2) with respect to vertical line X0.

A lower end portion of the shock absorber 15 is attached to a knuckle member 26 (FIG. 1) by means of a bracket 25. The lower part of the knuckle member 26 is pivotably supported on a lower arm 27 via a ball joint 28. The lower arm 27 is mounted on a cross-member 29 such that it can be moved up and down. The cross-member 29 extends in the width direction of the vehicle 10.

As shown in FIG. 2, the mount insulator 16 comprises vibration-proof rubber 31 and a support member 32 secured to the vehicle body 30. The support member 32 is provided with a fixing member 33 such as a bolt. The suspension 11 is swingably mounted on a suspension mounting portion 34, which is a part of the vehicle body 30 by the fixing member 33. The rod 21 of the shock absorber 15 is supported on the vehicle body 30 via a bearing 35. The rod 21 can be rotated about axis X2.

The coil spring 12 is mounted in the vehicle body 30 in an assembly state in which it is compressed between the lower spring seat 13 and the upper spring seat 14. In this specification, the length of the coil spring 12 in the assembly state is referred to as the "assembly height". The coil spring 12 extends to the maximum at the time of full-rebound, and compressed to the maximum at the time of full-bump. The "full-rebound" state refers to a state where the coil spring 12 is at maximum extension when the vehicle body is lifted while the coil spring 12 is fitted in the suspension 11. The "full-bump" state refers to a state where the coil spring is at maximum compression due to a load applied from the upper side of the vehicle body.

As described above, the coil spring 12 is arranged in such a state that it is constantly compressed between the lower spring seat 13 and the upper spring seat 14. The coil spring 12 extends and retracts within a predetermined range of deformation (i.e., between full-rebound and full-bump) in accordance with the magnitude of the load, as well as elastically supporting a load applied from above.

Figure 3:
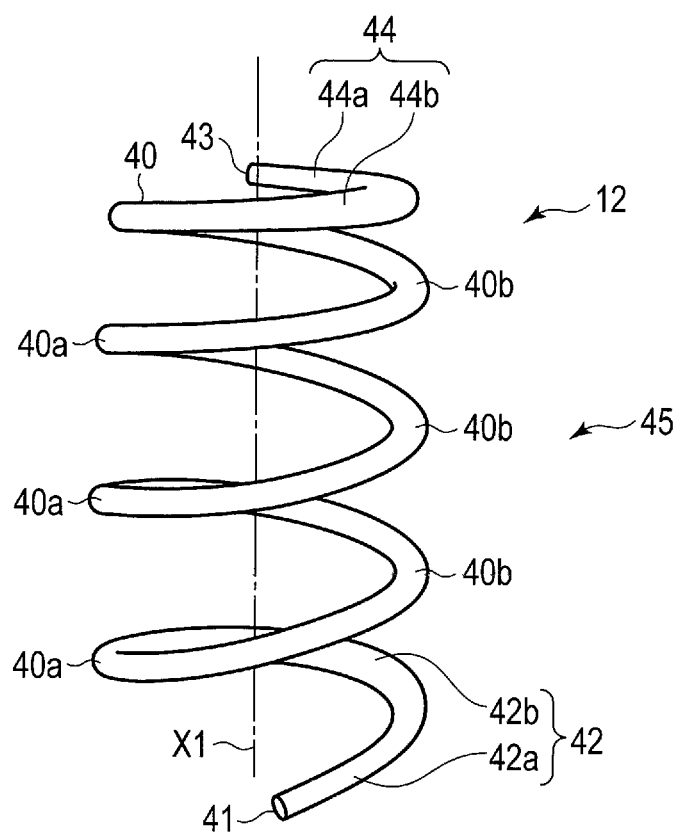
FIG. 3 is a perspective view showing an example of a coil spring used in the suspension shown in FIG. 1.

FIG. 3 shows the state in which no compressive load is applied to the coil spring 12 (i.e., the so-called free state). In this specification, the length of the coil spring 12 in the free state is referred to as the free length. When a load is applied to the coil spring 12, the coil spring 12 is deformed in the direction of making the length shorter than the free length. An example of the coil spring 12 is a cylindrical coil spring. As the other forms of a coil spring, according to the specification of the suspension, a coil spring such as a barrel-shaped coil spring, an hourglass coil spring, a tapered coil spring, a variable pitch coil spring, or a coil spring having its central axis already curved in the free state, may be employed.

The coil spring 12 shown in FIG. 3 comprises a wire 40 shaped helically. The wire 40 is formed of spring steel, and its cross-section is circular. The diameter (wire diameter) of the wire 40 is, for example, 12.5 mm. In an example of the coil spring 12, the average coil diameter is 110.0 mm, the free length (i.e., the length when no load is applied) is 382 mm, the number of effective turns is 5.39, and the spring constant is 33.3 N/mm. Although the wire diameter is mainly 8 to 21 mm, a wire diameter which does not fall within this range may be adopted.

The wire 40 is formed of spring steel. Although the type of spring steel is not limited, SAE 9254, which is the steel conforming to the U.S. Society of Automotive Engineers standard is given as an instance. The chemical components (mass %) of SAE 9254 are C: 0.51 to 0.59; Si: 1.20 to 1.60; Mn: 0.60 to 0.80; Cr: 0.60 to 0.80; S: 0.040 max.; P: 0.030 max.; and Fe: the remainder. As another example of the steel type, SUPT conforming to Japanese Industrial Standards (JIS) or a steel type other than the above may be used.

The coil spring 12 comprises a lower end turn portion 42, and an upper end turn portion 44. The lower end turn portion 42 is the part that is less than one turn from a lower end 41 of the wire 40. The upper end turn portion 44 is the part that is less than one turn from an upper end 43 of the wire 40. A helical effective portion 45 is formed between end turn portions 42 and 44. The effective portion 45 is wound at a pitch by which no contact is made in the wire 40 even when the coil spring 12 is at maximum compression. The effective portion 45 is the part which is involved with producing a reactive force when the coil spring 12 is compressed. The lower end turn portion 42 is supported by the lower spring seat 13. The upper end turn portion 44 is supported by the upper spring seat 14.

The lower end turn portion 42 includes a first portion 42a and a second portion 42b from the side of the lower end 41 of the wire 40 in the length direction of the wire 40. The first portion 42a extends from the lower end 41 of the wire 40 (i.e., zero turns) to a point of 0.6 turns, for example. The first portion 42a is always in contact with the lower spring seat 13 irrespective of the magnitude of the load applied in a state in which the coil spring 12 is fitted in the suspension 11.

The second portion 42b extends from a point around 0.6 turns, for example, to a point around 0.7 turns, for example. The second portion 42b contacts the spring seat 13 or is separated from the same in accordance with the magnitude of the load in a state in which the coil spring 12 is fitted in the suspension 11. That is, the second portion 42b is separated from the spring seat 13 when the load is small, and contacts the spring seat 13 when the load is large. Accordingly, the second portion 42b may be referred to as a "transition portion".

The upper end turn portion 44 includes a third portion 44a and a fourth portion 44b from the side of the upper end 43 of the wire 40 in the length direction of the wire 40. The third portion 44a extends from the upper end 43 of the wire 40 (i.e., zero turns) to a point of 0.6 turns, for example. The third portion 44a is always in contact with the upper spring seat 14 irrespective of the magnitude of the load applied in a state in which the coil spring 12 is fitted in the suspension 11.

The fourth portion 44b extends from a point around 0.6 turns, for example, to a point around 0.7 turns, for example. The fourth portion 44b contacts the spring seat 14 or is separated from the same in accordance with the magnitude of the load in a state in which the coil spring 12 is fitted in the suspension 11. That is, the fourth portion 44b is separated from the spring seat 14 when the load is small, and contacts the spring seat 14 when the load is large. Accordingly, the fourth portion 44b may be referred to as a "transition portion".

FIG. 4 shows the relationship between a position from the lower end 41 of the wire 40 (mm) and the wire diameter (mm). One-dot chain line M1 in FIG. 4 represents the average wire diameter of the effective portion 45. As shown in FIG. 4, the wire diameter is continuously changed in the length direction of the wire 40 in accordance with a position of turns from the lower end 41 of the wire 40. The first portion 42a is always in contact with the spring seat 13. Thus, the first portion 42a is the part which does not function as a spring. The wire diameter of the first portion 42a is smaller than a minimum value of the wire diameter of the effective portion 45. In contrast, the wire diameter of the second portion 42b is greater than that of the first portion 42a. Moreover, the wire diameter of the second portion 42b is greater than average wire diameter M1 of the effective portion 45. A first wire diameter varying portion 42c whose wire diameter is continuously varied is formed between the second portion 42b and the effective portion 45.

The third portion 44a is also always in contact with the spring seat 14. Thus, the third portion 44a is the part which does not function as a spring. The wire diameter of the third portion 44a is smaller than a minimum value of the wire diameter of the effective portion 45. In contrast, the wire diameter of the fourth portion 44b is greater than that of the third portion 44a, and is also greater than average wire diameter M1 of the effective portion 45. Since the likelihood that foreign matter such as sand will enter the space between the upper spring seat 14 and the fourth portion 44b is little, the wire diameter of the fourth portion 44b is made smaller than the wire diameter of the second portion 42b. A second wire diameter varying portion 44c whose wire diameter is continuously varied is formed between the fourth portion 44b and the effective portion 45.

The wire 40 of the present embodiment includes a large-diameter wire portion 40a and a small-diameter wire portion 40b which are formed alternately in approximately each turn of the wire 40. The large-diameter wire portion 40a is formed in a vehicle inner-side portion 12a of the coil spring 12 with respect to the width direction of the vehicle. Wire diameter d1 of the large-diameter wire portion 40a is greater than the average wire diameter of the effective portion 45.

In contrast, the small-diameter wire portion 40b is formed in a vehicle outer-side portion 12b of the coil spring 12 with respect to the width direction of the vehicle. Wire diameter d2 of the small-diameter wire portion 40b is smaller than wire diameter d1 of the large-diameter wire portion 40a. The wire 40 has its wire diameter gradually and continuously varied (so that the wire is tapered, for example) between the large-diameter wire portion 40a and the small-diameter wire portion 40b.

In an example shown in FIG. 4, the maximum value of the large-diameter wire portion 40a is 11.2 to 11.5 mm, the minimum value of the small-diameter wire portion 40b is 9.6 to 9.8 mm, and the average wire diameter of the effective portion 45 is 10.5 mm. The wire diameter of each of the first portion 42a and the third portion 44a is 9 mm, which is the minimum value. Two-dot chain line M2 in FIG. 4 represents the wire diameter of a conventional coil spring whose wire diameter is constant.

The wire 40 whose wire diameter is varied continuously as in the present embodiment can be formed by machine processing such as cutting, diameter reduction (a type of forging) by a swaging machine, or plastic working such as a press. By the swaging, it is possible to avoid a boundary portion which causes stress concentration, as seen when a portion where the wire diameter is varied is to be formed by cutting processing, from being created. Also, it is possible to prevent a metal flow of a metal structure from being cut by processing such as the cutting processing. Accordingly, with the swaging, a portion in which the wire diameter is varied can be made smooth and continuous. Alternatively, by a dieless forming apparatus, the end turn portions 42 and 44 in which the wire diameters are varied, respectively, the large-diameter wire portion 40a, and the small-diameter wire portion 40b can be formed. The dieless forming apparatus includes a supply-side roller and a draw-side roller, and a material is drawn between these rollers, thereby varying the wire diameter.

The wire 40 which has been processed by these processing means is shaped into a helical form by a bending process (for example, a hot coiling process). Further, heat treatment such as tempering and shot peening are performed. After that, adjustment such as setting is performed as necessary, and then coating and quality inspection are further performed before a product is completed. The coil spring 12 is mounted on the shock absorber 15 in such a state that the coil spring 12 is compressed between the spring seats 13 and 14 and a preload is applied, and is further arranged in the vehicle body 30.

A vertical load is applied to the suspension 11 which is set in the vehicle body 30. The coil spring 12 is further compressed and deformed between the lower spring seat 13 and the upper spring seat 14 in accordance with this load. The coil spring 12 which is mounted between the spring seats 13 and 14 extends and retracts within a predetermined range of deformation (i.e., between the full-rebound state and the full-bump state) in accordance with the load.

The effective portion 45 of the coil spring 12 of the present embodiment comprises the large-diameter wire portion 40a formed in the vehicle inner-side portion 12a, and the small-diameter wire portion 40b formed in the vehicle outer-side portion 12b. The vehicle outer-side portion 12b is compressed more than the vehicle inner-side portion 12a. Accordingly, the stress distribution of the wire 40 which is in the assembly state compressed between the spring seats 13 and 14 can be approximated to a uniform distribution. For example, in an effective portion 45 of a conventional coil spring, it was found that the wire diameter was 11.0 mm, the total number of turns was 5.39, the spring constant was 33.3 N/mm, and the weight was 2.09 kg. In contrast, in the effective portion 45 of the coil spring 12 of the present embodiment, it was found that the wire diameter of the large-diameter wire portion 40a was 11.3 mm, the wire diameter of the small-diameter wire portion 40b was 9.7 mm, the average wire diameter was 10.5 mm, the total number of turns was 4.93, the spring constant was 33.3 N/mm, and the weight was 1.79 kg. The coil spring 12 of the present embodiment has enabled the weight to be reduced as compared to the conventional coil spring.

A suspension according to a second embodiment of the present invention will now be described with reference to FIGS. 5 to 7.

Figure 5:
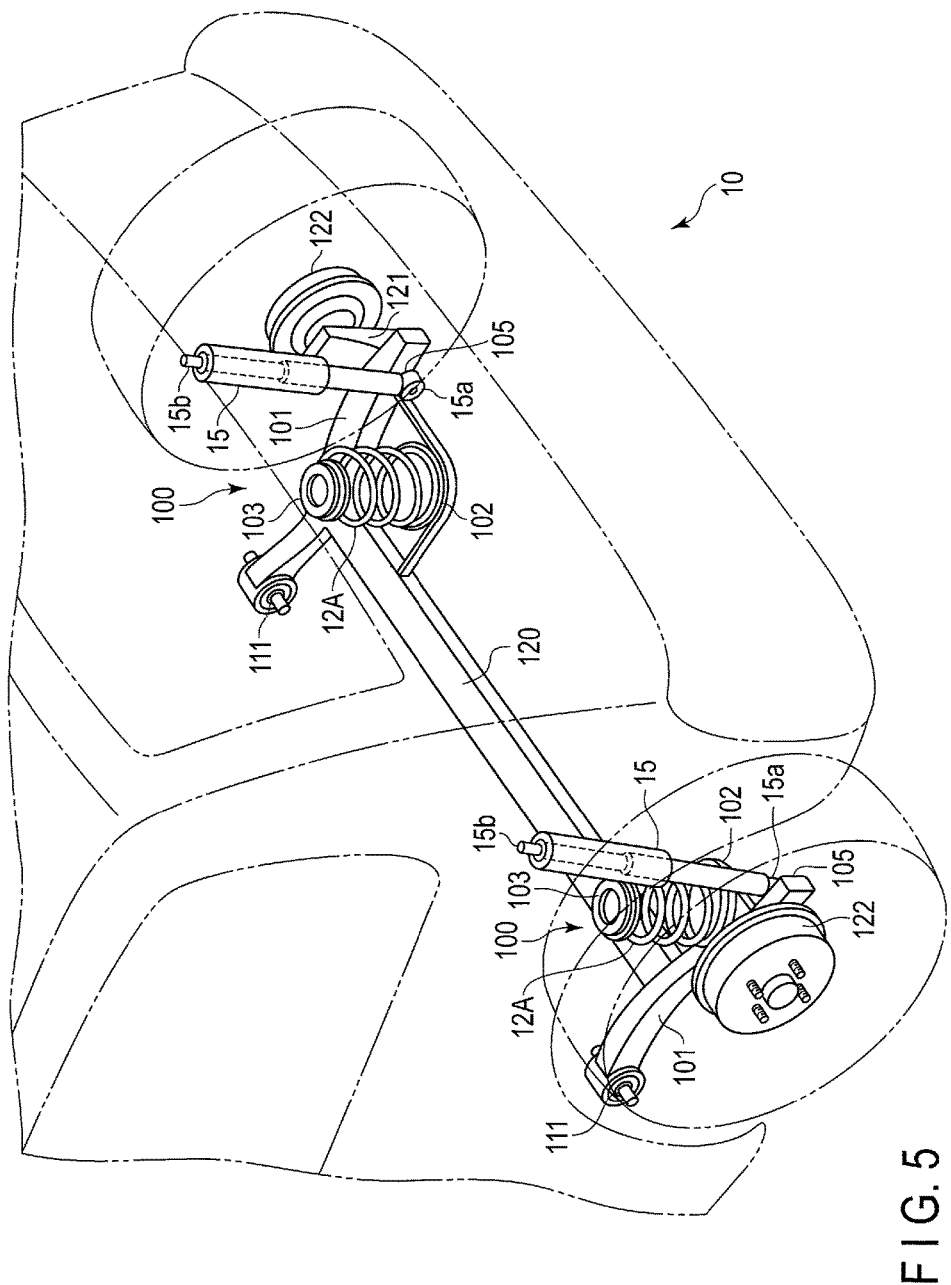
FIG. 5 is a perspective view which schematically shows a part of a vehicle provided with a suspension according to a second embodiment.

FIG. 5 shows a pair of right and left trailing-arm-type suspensions 100 provided on a rear side of a vehicle 10. The suspensions 100 are an example of a knee-action-type suspension. Since the pair of right and left suspensions 100 have structures similar to each other, one of the suspensions 100 will be hereinafter described as a typical example of the suspensions.

FIG. 6 is a side view of the suspension 100 as seen from the side of the vehicle 10. The suspension 100 comprises an arm member 101 which functions as a trailing arm, a coil spring (a compression coil spring) 12A, a lower spring seat 102, an upper spring seat 103, and a shock absorber 105. A lower end 15a of the shock absorber 15 is attached to a mounting portion 105 of the arm member 101. An upper end 15b of the shock absorber 15 is attached to a vehicle body.

The arm member 101 is attached to an arm mounting portion 110 (FIG. 6), which is a part of the vehicle body, such that it is pivotable in the upward and downward directions via a pivot 111. That is, as the arm member 101 is pivoted in the upward and downward directions about the pivot 111 supported on the vehicle body, the arm member 101 is configured to perform the so-called knee action.

As shown in FIG. 5, the arm members 101 of the pair of right and left suspensions 100 are coupled to each other by a beam member 120. The beam member 120 extends in the width direction of the vehicle 10. The beam member 120 may function as a torsion beam which produces a repulsive force with respect to input applied in a torsional direction. The arm member 101 is provided with an axle support portion 121. The axle support portion 121 is provided with a hub unit 122 on which a tire is mounted.

The lower spring seat 102 is provided on the arm member 101. The lower spring seat 102 and the arm member 101 move up and down together. The upper spring seat 103 is provided on a spring mounting portion 130, which is a part of the vehicle body. The lower spring seat 102 swings up and down along arc-shaped trajectory X3 (FIG. 6) with the pivot 111 being the center relative to the upper spring seat 103.

The coil spring 12A is compressed between the lower spring seat 102 and the upper spring seat 103. The coil spring 12A urges the arm member 101 relatively downward. Further, the coil spring 12A extends and retracts within a predetermined range of deformation (i.e., between the full-rebound state and the full-bump state). The arm member 101 moves as arc-shaped trajectory X3 is drawn with the pivot 111 being the center. Accordingly, the more the load applied to the coil spring 12A is increased and the coil spring 12A comes close to the full-bump state, the greater the compression amount of a portion 12d which is on a side far from the pivot 111 will be as compared to a portion 12c which is on a side close to the pivot 111.

Likewise the coil spring 12 of the first embodiment, the coil spring 12A comprises a lower end turn portion 42, an upper end turn portion 44, and a helical effective portion 45. The effective portion 45 is formed between end turn portions 42 and 44. The lower end turn portion 42 is supported by the lower spring seat 102. The upper end turn portion 44 is supported by the upper spring seat 103.

The lower end turn portion 42 includes a first portion 42a and a second portion 42b. The upper end turn portion 44 includes a third portion 44a and a fourth portion 44b. The first portion 42a and the third portion 44a are always in contact with the spring seats 102 and 103, respectively, regardless of a load. The second portion 42b and the fourth portion 44b contact the spring seats 102 and 103, or are separated from the same, respectively, in accordance with the load.

FIG. 7 shows an example of the relationship between a position from a lower end 41 of a wire 40 and the wire diameter. One-dot chain line M1 in FIG. 7 represents the average wire diameter of the effective portion 45. As shown in FIG. 7, the wire diameter is changed in the length direction of the wire 40 in accordance with the position from the lower end 41 of the wire 40. The wire diameter of the second portion 42b is greater than that of the first portion 42a, and is also greater than average wire diameter M1 of the effective portion 45. The wire diameter of the fourth portion 44b is greater than that of the third portion 44a, and is also greater than average wire diameter M1 of the effective portion 45.

Further, the effective portion 45 includes a large-diameter wire portion 40a and a small-diameter wire portion 40b which are formed alternately in approximately each turn. The large-diameter wire portion 40a is provided at a portion 12c, which is on a side near the pivot 111. The wire diameter of the large-diameter wire portion 40a is greater than average wire diameter M1 of the effective portion 45. Two-dot chain line M2 in FIG. 7 represents the wire diameter of a conventional coil spring whose wire diameter is constant.

The small-diameter wire portion 40b is provided at a portion 12d, which is on a side far from the pivot 111. The wire diameter of the small-diameter wire portion 40b is smaller than the wire diameter of the large-diameter wire portion 40a. That is, in the effective portion 45 of the coil spring 12A, the large-diameter wire portion 40a, which takes the maximum value of wire diameter, and the small-diameter wire portion 40b, which takes the minimum value of wire diameter, are alternately formed in approximately each turn. In the example shown in FIG. 7, the maximum value of the large-diameter wire portion 40a is 9.6 to 9.8 mm, the minimum value of the small-diameter wire portion 40b is 9.1 to 9.2 mm, and the average wire diameter of the effective portion 45 is 9.55 mm. The wire diameter of each of the end turn portions 42 and 44 is 8 mm, which is the minimum value.

As in the coil spring 12 of the first embodiment, in the coil spring 12A, the wire diameter of the second portion 42b is made greater than that of the first portion 42a. Also, the wire diameter of the fourth portion 44b is made greater than that of the third portion 44a. In addition, the wire diameter of each of the second portion 42b and the fourth portion 44b is made greater than average wire diameter M1 of the effective portion 45. Moreover, the wire diameter of the second portion 42b is made greater than that of the fourth portion 44b. Consequently, it becomes possible to make the end turn portions 42 and 44 hard to break even if the end turn portions 42 and 44 are worn or foreign matter such as sand is trapped in the end turn portions 42 and 44. This structure is greatly advantageous in preventing the lower end turn portion 42, in particular, from breaking.

Needless to say, in carrying out the present invention, in addition to the specific shape and dimension, the number of turns, the material (steel type), and the spring constant of the coil spring, the form, structure, arrangement and the like of each of the elements which constitute the suspension (for example, the upper and lower spring seats, etc.) may be modified variously. For example, the wire diameter of the effective portion of the coil spring may be constant in the length direction of the wire. Also, the second portion having a larger wire diameter than the wire diameter of the first portion and the average wire diameter of the effective portion may be provided in only the lower end turn portion, and the upper end turn portion may be formed in the same way as for a general coil spring.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension coil spring formed of a wire made of spring steel, which is shaped helically, the coil spring being arranged in a state that it is compressed between a lower spring seat and an upper spring seat of a suspension, and extends and retracts within a predetermined range of deformation according to a load, the coil spring comprising:
   a lower end turn portion which is supported by the lower spring seat,
   an upper end turn portion which is supported by the upper spring seat, and
   an effective portion formed between the end turn portions, wherein the lower end turn portion comprises:
      a first portion which is in contact with the lower spring seat irrespective of magnitude of the load; and
      a second portion formed between the first portion and the effective portion, the second portion being in contact with the lower spring seat or separated from the lower spring seat according to the load, a wire diameter of the second portion being greater than a wire diameter of the first portion and greater than an average wire diameter of the effective portion, and the wire diameter of the second portion being substantially constant along a length direction of the wire,
   wherein the effective portion includes a large-diameter wire portion formed on a side opposite to the second portion with respect to a position about a central axis of the coil spring and a small-diameter wire portion formed on a same side as the second portion with respect to a position about the central axis of the coil spring,
   wherein the large-diameter wire portion is arranged on an inner side of a vehicle, and the small-diameter wire portion and the second portion are arranged on an outer side of the vehicle,
   wherein a maximum value of the wire diameter of the large-diameter wire portion is greater than the wire diameter of the second portion,
   wherein a minimum value of the wire diameter of the small-diameter wire portion is greater than the wire diameter of the first portion and the minimum value of the wire diameter of the small-diameter wire portion is smaller than the wire diameter of the second portion, and
   wherein the wire comprises a steel structure, and a metal flow of the steel structure continues in a longitudinal direction of the wire along the large-diameter wire portion, the small-diameter wire portion, the first portion, and the second portion.

2. The suspension coil spring of claim 1, wherein the upper end turn portion comprises:
   a third portion which is in contact with the upper spring seat irrespective of magnitude of the load; and
   a fourth portion formed between the third portion and the effective portion, the fourth portion being in contact with the upper spring seat or separated from the upper spring seat according to the load, a wire diameter of the fourth portion being greater than a wire diameter of the third portion and the average wire diameter of the effective portion, and the wire diameter of the fourth portion being substantially constant along the length direction of the wire.

3. The suspension coil spring of claim 2, wherein the wire diameter of the second portion is greater than the wire diameter of the fourth portion.

4. The suspension coil spring of claim 2, wherein:
   a first wire diameter varying portion whose wire diameter is continuously varied is provided between the second portion and the effective portion; and
   a second wire diameter varying portion whose wire diameter is continuously varied is provided between the fourth portion and the effective portion.

5. The suspension coil spring of claim 3, wherein:
   a first wire diameter varying portion whose wire diameter is continuously varied is provided between the second portion and the effective portion; and
   a second wire diameter varying portion whose wire diameter is continuously varied is provided between the fourth portion and the effective portion.

6. The suspension coil spring of claim 1, wherein:
   the large-diameter wire portion is arranged on the inner side of the vehicle with respect to a width direction of the vehicle, and the small-diameter wire portion and the second portion are arranged on the outer side of the vehicle with respect to the width direction of the vehicle.

7. A suspension coil spring formed of a wire made of spring steel, which is shaped helically, the coil spring being arranged in a state that it is compressed between a lower spring seat and an upper spring seat of a suspension, and extends and retracts within a predetermined range of deformation according to a load, the coil spring comprising:

a lower end turn portion which is supported by the lower spring seat, an upper end turn portion which is supported by the upper spring seat, and an effective portion formed between the end turn portions, wherein the lower end turn portion comprises:

a first portion which is in contact with the lower spring seat irrespective of magnitude of the load; and a second portion formed between the first portion and the effective portion, the second portion being in contact with the lower spring seat or separated from the lower spring seat according to the load, a wire diameter of the second portion being greater than a wire diameter of the first portion and greater than an average wire diameter of the effective portion, and the wire diameter of the second portion being substantially constant along a length direction of the wire, wherein the effective portion includes a large-diameter wire portion formed on a side opposite to the second portion with respect to a position about a central axis of the coil spring and a small-diameter wire portion formed on a same side as the second portion with respect to a position about the central axis of the coil spring, wherein the large-diameter wire portion is arranged on a front side of the vehicle, and the small-diameter wire portion and the second portion are arranged on a rear side of the vehicle, wherein a maximum value of the wire diameter of the large-diameter wire portion is greater than the wire diameter of the second portion, wherein a minimum value of the wire diameter of the small-diameter wire portion is greater than the wire diameter of the first portion and the minimum value of the wire diameter of the small-diameter wire portion is smaller than the wire diameter of the second portion, and wherein the wire comprises a steel structure, and a metal flow of the steel structure continues in a longitudinal direction of the wire along the large-diameter wire portion, the small-diameter wire portion, the first portion, and the second portion.

* * * * *